(12) United States Patent
Kushnirskiy et al.

(10) Patent No.: US 8,321,553 B2
(45) Date of Patent: Nov. 27, 2012

(54) METHOD AND APPARATUS FOR CALLING VIRTUAL MACHINE ACROSS PROCESSES

(75) Inventors: Igor Davidvoich Kushnirskiy, Santa Clara, CA (US); Sergey V. Lunegov, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 2975 days.

(21) Appl. No.: 10/113,479

(22) Filed: Mar. 29, 2002

(65) Prior Publication Data

US 2003/0217086 A1 Nov. 20, 2003

(51) Int. Cl.
*G06F 15/173* (2006.01)
(52) U.S. Cl. ........ 709/224; 709/201; 709/202; 709/223; 370/252; 714/39; 714/46.1
(58) Field of Classification Search .......... 709/201–203, 709/223, 224; 718/1, 102; 719/330, 310, 719/328; 717/120, 147, 148; 707/101; 714/39, 714/46.1; 370/252
See application file for complete search history.

(56) References Cited

U.S. PATENT DOCUMENTS

| | | | | |
|---|---|---|---|---|
| 6,003,065 A | * | 12/1999 | Yan et al. | 709/201 |
| 6,223,202 B1 | * | 4/2001 | Bayeh | 718/102 |
| 6,233,725 B1 | * | 5/2001 | Beadle et al. | 717/118 |
| 6,401,109 B1 | * | 6/2002 | Heiney et al. | 718/1 |
| 6,553,428 B1 | * | 4/2003 | Ruehle et al. | 719/330 |
| 6,604,106 B1 | * | 8/2003 | Bodin et al. | 707/101 |
| 6,717,589 B1 | * | 4/2004 | Grillo et al. | 715/715 |
| 6,823,358 B1 | * | 11/2004 | Spender | 709/203 |
| 2003/0126311 A1 | * | 7/2003 | Kushnirskiy et al. | 709/328 |

OTHER PUBLICATIONS

Dillenberger et al. "Building a Java virtual machine for server applications: The Jvm on OS/390"; vol. 39, Jan. 2000.*
Microsoft: "Microsoft Java Virtual Machine Support", Sep. 12, 2003.*
Java for Mac OS X; http://www.apple.com/macosx/features/java/.*

* cited by examiner

*Primary Examiner* — Thu Ha Nguyen
(74) *Attorney, Agent, or Firm* — Marsh Fischmann & Breyfogle LLP

(57) ABSTRACT

Embodiments of the present invention are directed towards a method and apparatus for calling virtual machine across processes. In one embodiment, it is determined whether a virtual machine is running in the same process. If a virtual machine is running in the same process, that virtual machine is used. If a virtual machine is running in another process, the application sends commands for the virtual machine to an intermediary application in the same process. The intermediary application passes the commands on to another intermediary application in the process where the virtual machine is running, and that intermediary application sends the commands to the virtual machine. Communication from the virtual machine to the application are performed in the reverse order.

12 Claims, 3 Drawing Sheets

METHOD AND APPARATUS FOR CALLING VIRTUAL MACHINE ACROSS PROCESSES

BACKGROUND OF THE INVENTION

1. Field of the Invention

The present invention relates to the field of computer software, and in particular to a method and apparatus for calling virtual machine across processes.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Some computer applications make use of a virtual machine to perform some computations. For example, a Java virtual machine, JVM, is used to interpret and execute machine-independent Java code. Some applications must run in the same process as a virtual machine in order to use it. Since some applications are unable to use a virtual machine running in another process, another virtual machine is started in the application's process. As a result, memory is wasted by running duplicate virtual machines. This problem can be better understood by an examination of the Mozilla/Netscape6.x browser and blackConnect's interaction with a JVM.

Mozilla/Netscape 6.x, blackConnect and JVM

The Mozilla/Netscape 6.x browser is shipped with Sun Microsystems' Java plugin, which enables applet support for the browser. The Java plugin runs a JVM for the browser. Some applications, for example blackConnect which runs in the same process as the browser, require that the JVM runs in the same process as the application. If the Java plugin runs the JVM in the browser's process, blackConnect uses that JVM. If no JVM is found in the process, a new JVM is started.

On Solaris and Linux platforms, Sun Microsystems' Java plugin starts the JVM in a new process. Thus, this JVM is not accessible by blackConnect and blackConnect starts a new JVM. As a result, more than 20 megabytes of memory is wasted by the redundant JVM.

SUMMARY OF THE INVENTION

Embodiments of the present invention are directed towards a method and apparatus for calling virtual machine across processes. In one embodiment, it is determined whether a virtual machine is running in the same process. If a virtual machine is running in the same process, that virtual machine is used. If no virtual machine is running in the process, it is determined whether a virtual machine is running in another process. If no virtual machine is running, a virtual machine is started in the same process as the application using the virtual machine.

If a virtual machine is running in another process, the application sends commands for the virtual machine to an intermediary application in the same process. The intermediary application passes the commands on to another intermediary application in the process where the virtual machine is running, and that intermediary application sends the commands to the virtual machine. Communication from the virtual machine to the application are performed in the reverse order.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for remote inter-language method calling. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Single Process

In one embodiment, it is determined whether a virtual machine is running in the same process. If a virtual machine is running in the same process, that virtual machine is used. If no virtual machine is running in the process, it is determined whether a virtual machine is running in another process. If no virtual machine is running, a virtual machine is started in the same process as the application using the virtual machine.

Figure 1:
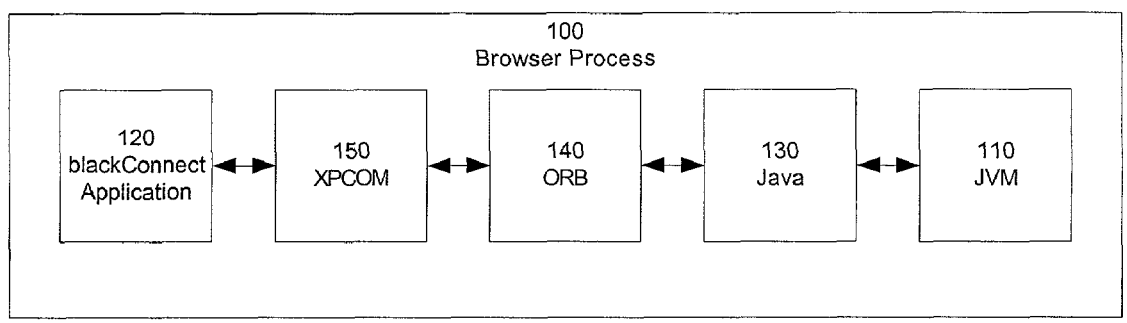
FIG. 1 is a block diagram of communication between blackConnect and a JVM in a browser process that has a JVM in accordance with one embodiment of the present invention.

FIG. 1 illustrates communication between blackConnect and a JVM in a browser process that has a JVM in accordance with one embodiment of the present invention. The browser process 100 has a JVM 110 and a blackConnect 120 application. The JVM communicates using Java 130 with an ORB 140, and blackConnect communicates with the same ORB using XPCOM 150. Thus, messages are passed back and forth between blackConnect and the JVM.

Cross-Process Communications

If a virtual machine is running in another process, the application sends commands for the virtual machine to an intermediary application in the same process. The intermediary application passes the commands on to another intermediary application in the process where the virtual machine is running, and that intermediary application sends the commands to the virtual machine. Communication from the virtual machine to the application are performed in the reverse order.

Figure 2:
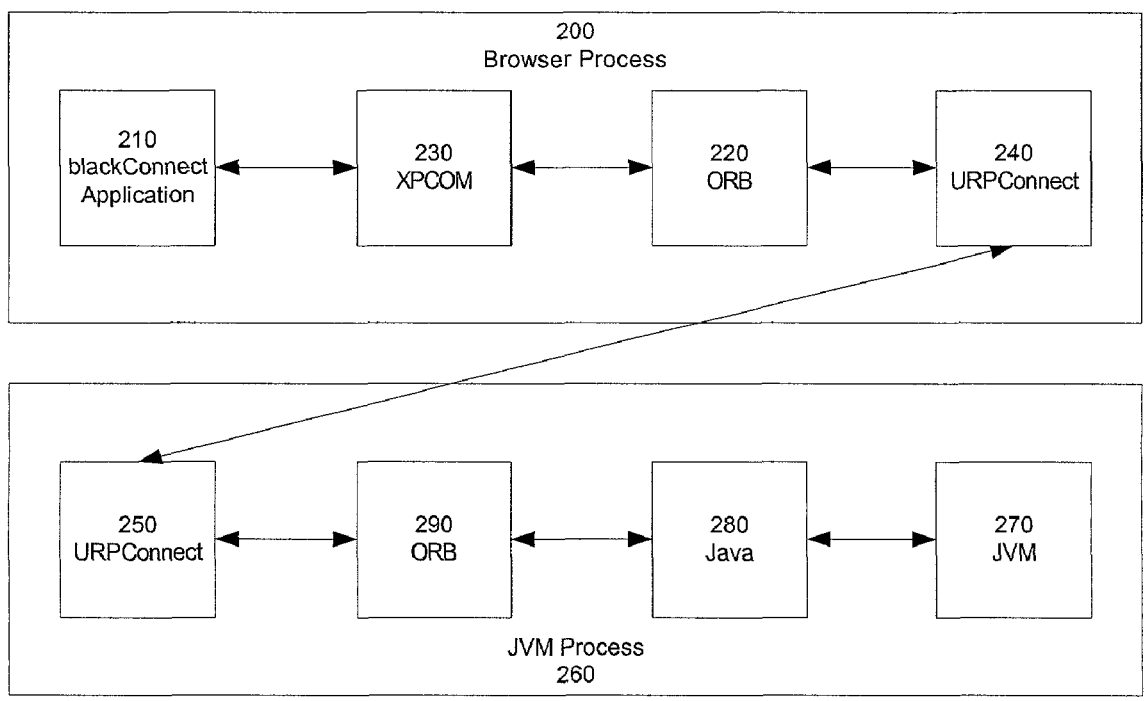
FIG. 2 is a block diagram of communication between blackConnect and a JVM when blackConnect is in a browser process that does not have a JVM in accordance with one embodiment of the present invention.

FIG. 2 illustrates communication between blackConnect and a JVM when blackConnect is in a browser process that does not have a JVM in accordance with one embodiment of the present invention. The browser process 200 has the blackConnect 210 application that communicates with ORB 220 using XPCOM 230. ORB 220, in turn, communicates with URPConnect 240. URPConnect 240 is able to communicate with URPConnect 250 in the JVM process 260. The JVM 270 communicates using Java 280 with ORB 290, and ORB 290 communicates with URPConnect 250. Thus, blackConnect and the JVM can communicate by passing messages through ORB 220, ORB 290, URPConnect 240 and URPConnect 250. As a result, blackConnect does not need to start a redundant JVM in the browser process and no memory is wasted.

In FIG. 2, all Java components are local components for applications in the JVM process. However, all Java components are remote components for applications in the browser process. Similarly, all browser components are remote components for applications in the JVM process. In one embodiment, remote invocation with blackConnect is transparent for the callee because interaction between processes with URP connect is object based. Calls from the callee are made as they would be if the JVM were in the browser process and the calls are automatically routed to the JVM in the JVM process.

Embodiment of Computer Execution Environment (Hardware)

Figure 3:
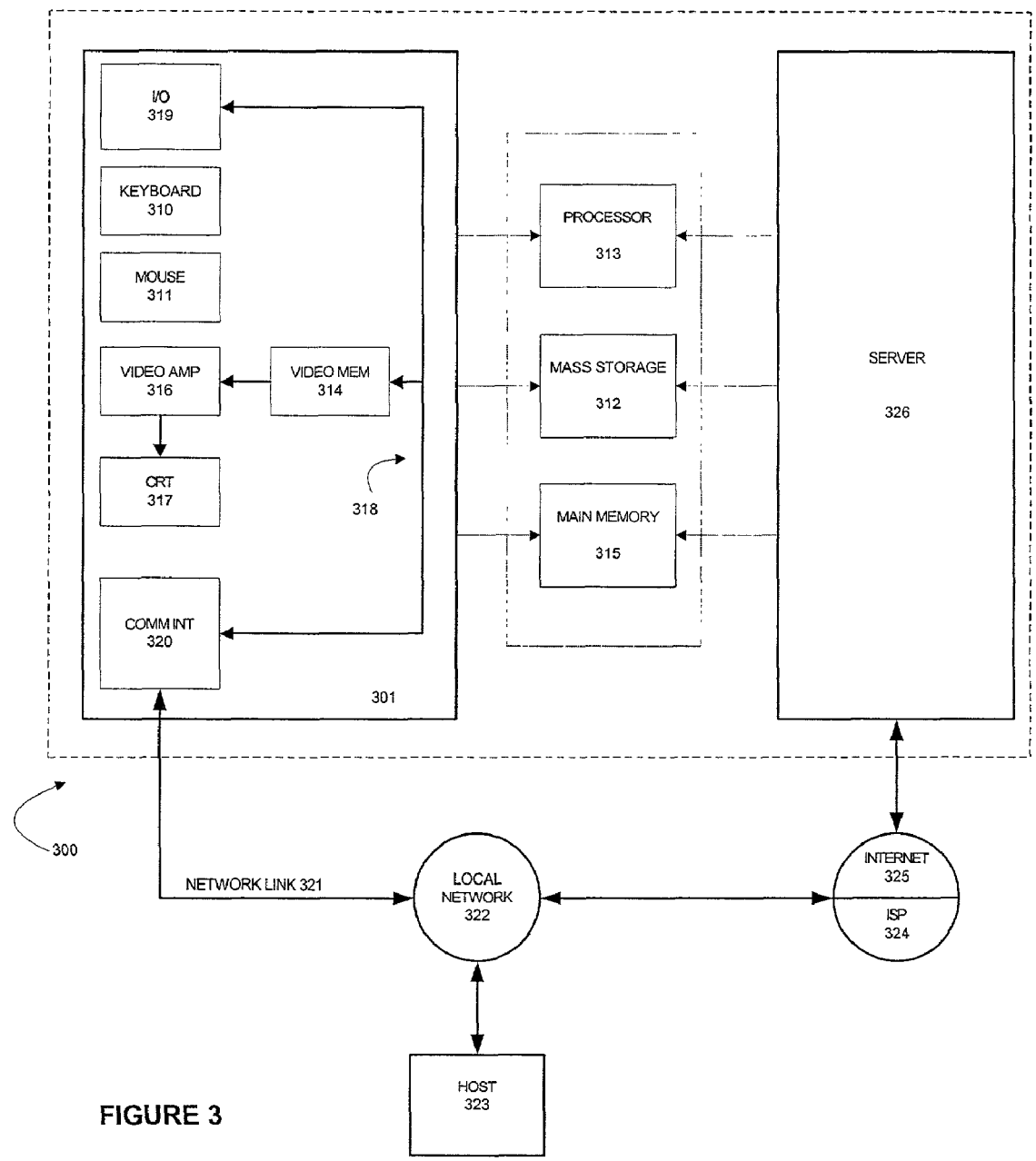
FIG. 3 is a block diagram of a general purpose computer.

An embodiment of the invention can be implemented as computer software in the form of computer readable program code executed in a general purpose computing environment such as environment 300 illustrated in FIG. 3, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 310 and mouse 311 are coupled to a system bus 318. The keyboard and mouse are for introducing user input to the computer system and communicating that user input to central processing unit (CPU) 313. Other suitable input devices may be used in addition to, or in place of, the mouse 311 and keyboard 310. I/O (input/output) unit 319 coupled to bidirectional system bus 318 represents such I/O elements as a printer, A/V (audio/video) I/O, etc.

Computer 301 may include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Wireless links are also possible. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by ISP 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Processor 313 may reside wholly on client computer 301 or wholly on server 326 or processor 313 may have its computational power distributed between computer 301 and server 326. Server 326 symbolically is represented in FIG. 3 as one unit, but server 326 can also be distributed between multiple "tiers". In one embodiment, server 326 comprises a middle and back tier where application logic executes in the middle tier and persistent data is obtained in the back tier. In the case where processor 313 resides wholly on server 326, the results of the computations performed by processor 313 are transmitted to computer 301 via Internet 325, Internet Service Provider (ISP) 324, local network 322 and communication interface 320. In this way, computer 301 is able to display the results of the computation to a user in the form of output.

Computer 301 includes a video memory 314, main memory 315 and mass storage 312, all coupled to bi-directional system bus 318 along with keyboard 310, mouse 311 and processor 313. As with processor 313, in various computing environments, main memory 315 and mass storage 312, can reside wholly on server 326 or computer 301, or they may be distributed between the two. Examples of systems where processor 313, main memory 315, and mass storage 312 are distributed between computer 301 and server 326 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 32-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a SPARC microprocessor from Sun Microsystems, Inc., a microprocessor manufactured by Motorola, such as the 680x0 processor, or a microprocessor manufactured by Intel, such as the 80x86 or Pentium processor. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

Computer 301 can send messages and receive data, including program code, through the network(s), network link 321, and communication interface 320. In the Internet example, remote server computer 326 might transmit a requested code for an application program through Internet 325, ISP 324, local network 322 and communication interface 320. The received code may be executed by processor 313 as it is received, and/or stored in mass storage 312, or other non-volatile storage for later execution. In this manner, computer 300 may obtain application code in the form of a carrier wave. Alternatively, remote server computer 326 may execute applications using processor 313, and utilize mass storage 312, and/or video memory 315. The results of the execution at server 326 are then transmitted through Internet 325, ISP 324, local network 322 and communication interface 320. In this example, computer 301 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for remote inter-language method calling is described in conjunction with one or more specific embodiments. The invention is defined by the following claims and their full scope and equivalents.

The invention claimed is:

1. A method for cross-process virtual machine calling comprising:
    determining whether a virtual machine is running in a first process;
    if no virtual machine is running in said first process, issuing a call to a virtual machine in a second process from said first process;
    forwarding said call from said first process to said second process; and
    delivering said call to said virtual machine in said second process.

2. The method of claim 1 wherein said step of forwarding comprises:
    receiving said call at a first URPConnect module in said first process; and
    transmitting said call from said first URPConnect module to a second URPConnect module in said second process.

3. The method of claim 1 wherein said virtual machine is a Java virtual machine.

4. The method of claim 1 wherein said call is object based.

5. A cross-process virtual machine calling system comprising:
    a call issuer configured to
        determine whether a virtual machine is running in a first process, and
        if no virtual machine is running in said first process, issue a call to a virtual machine in a second process from said first process;
    a forwarding unit configured to forward said call from said first process to said second process; and
    a delivery unit configured to deliver said call to said virtual machine in said second process.

6. The cross-process virtual machine calling system of claim 5 wherein said forwarding unit comprises:
    a first URPConnect module configured to receive said call in said first process; and
    a second URPConnect module in said second process configured to receive said call from said first URPConnect module.

7. The cross-process virtual machine calling system of claim 5 wherein said virtual machine is a Java virtual machine.

8. The cross-process virtual machine calling system of claim 5 wherein said call is object based.

9. A computer program product comprising:
    a non-transitory computer usable medium having computer readable program code embodied therein configured for cross-process virtual machine calling, comprising:
    computer readable code configured to cause a computer to determine whether a virtual machine is running in a first process, and if no virtual machine is running in said first process,
    issue a call to a virtual machine in a second process from said first process;
    computer readable code configured to cause a computer to forward said call from said first process to said second process; and
    computer readable code configured to cause a computer to deliver said call to said virtual machine in said second process.

10. The computer program product of claim 9 wherein said computer readable code configured to cause a computer to forward comprises:
    computer readable code configured to cause a computer to receive said call at a first URPConnect module in said first process; and
    computer readable code configured to cause a computer to transmit said call from said first URPConnect module to a second URPConnect module in said second process.

11. The computer program product of claim 9 wherein said virtual machine is a Java virtual machine.

12. The computer program product of claim 9 wherein said call is object based.

* * * * *